(12) United States Patent
Neyens et al.

(10) Patent No.: US 10,960,850 B2
(45) Date of Patent: Mar. 30, 2021

(54) MACHINE TAMPER DETECTION

(71) Applicant: Caterpillar Inc., Peoria, IL (US)

(72) Inventors: Vincent Neyens, Peoria, IL (US); Fernando Venegas, San Jose, CA (US); Brian R. Huffman, Rossville, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/437,964

(22) Filed: Jun. 11, 2019

(65) Prior Publication Data

US 2020/0391697 A1    Dec. 17, 2020

(51) Int. Cl.
*B60R 25/34* (2013.01)
*B60R 25/40* (2013.01)
*B60R 25/10* (2013.01)

(52) U.S. Cl.
CPC .......... *B60R 25/34* (2013.01); *B60R 25/1001* (2013.01); *B60R 25/403* (2013.01)

(58) Field of Classification Search
CPC .... B60R 25/34; B60R 25/403; B60R 25/1001
See application file for complete search history.

(56) References Cited

U.S. PATENT DOCUMENTS

| | | | | |
|---|---|---|---|---|
| 4,654,638 A * | 3/1987 | Clift | ...................... | H04M 11/04 340/506 |
| 5,081,444 A * | 1/1992 | Nicholson | ............ | G01R 31/007 340/545.6 |
| 5,161,182 A * | 11/1992 | Merriam | .............. | H04M 11/002 379/106.07 |
| 6,639,511 B2 | 10/2003 | Haruna et al. | | |
| 2001/0015919 A1* | 8/2001 | Kean | ....................... | G06F 21/72 365/200 |
| 2011/0148631 A1* | 6/2011 | Lanham | ................. | G08B 13/06 340/540 |

(Continued)

FOREIGN PATENT DOCUMENTS

| | | | | |
|---|---|---|---|---|
| CN | 104691443 B | | 1/2018 | |
| EP | 1657689 A2 * | | 5/2006 | ......... G08B 13/1654 |
| GB | 2298300 B | | 8/1998 | |

(Continued)

OTHER PUBLICATIONS

ST, HCF4051 Single 8-channel analog multiplexer/demultiplexer, Apr. 2013, p. 1. (Year: 2013).*

*Primary Examiner* — Brian Wilson
(74) *Attorney, Agent, or Firm* — Harrity & Harrity LLP

(57) ABSTRACT

A tamper detection system is disclosed. The tamper detection system may include an electronic control module (ECM) of a machine and a tamper detection module. The tamper detection module may detect, while the machine is powered off, an opening of a switch that is associated with a component of the machine. The opening of the switch may indicate tampering with the component of the machine. The tamper detection module may set, while the machine is powered off, a state of a latch based on detecting the opening of the switch. The state, while set, may indicate that the switch was opened. The tamper detection module may cause, when the machine is powered on, the ECM to provide an indication that tampering with the component of the machine has occurred based on the state.

20 Claims, 3 Drawing Sheets

(56) References Cited

U.S. PATENT DOCUMENTS

2016/0082925 A1\* 3/2016 Arocha .................. B60R 25/34
340/426.24

FOREIGN PATENT DOCUMENTS

| JP | 2003072519 | A | 3/2003 |
| JP | 4816433 | B2 | 11/2011 |
| JP | 6011379 | B2 | 10/2016 |

\* cited by examiner

MACHINE TAMPER DETECTION

TECHNICAL FIELD

The present disclosure relates generally to a tamper detection system and, more particularly, to a tamper detection system for a machine.

BACKGROUND

A machine may include an array of sensors that collect and report data to one or more electronic control modules (ECMs) of the machine. For example, the sensors may monitor various components of the machine in order to collect data that the ECMs may use for determining a remaining useful life of a component, an operation of a component, a presence of a component, a safety of a component, and/or the like. However, while the machine is powered off, the sensors and the ECMs are typically unable to monitor the machine's components. Furthermore, even if the sensors and the ECMs were to receive power from a battery of the machine while the machine is powered off, disconnection or removal of the battery would prevent monitoring by the sensors and the ECMs.

One attempt to prevent an in-vehicle device from being disassembled is disclosed in Chinese Patent No. 104691443 that issued to Xiamen Yaxon Networks Co. Ltd. on Jan. 2, 2018 ("the '443 patent"). In particular, the '443 patent discloses a device that can detect whether an in-vehicle device is removed. Furthermore, the '443 patent indicates that when the in-vehicle device is disassembled, the vehicle may be locked to prevent the in-vehicle device from being removed.

While the '443 patent may address detecting whether an in-vehicle device is removed, the '443 patent does not suggest a passive tamper detection system that can detect and record a tamper event while a machine is powered off, and provide an indication of the tamper event when the machine is powered on. Furthermore, the '443 patent does not suggest a tamper detection system that can detect and record a tamper event associated with a non-powered component of a machine (e.g., a plug for a fluid of the machine, a filter of a machine, an access panel of a machine, and/or the like).

The tamper detection system of the present disclosure solves one or more of the problems set forth above and/or other problems in the art.

SUMMARY

According to some implementations, a tamper detection module may include a latch; a switch conditioning circuit, the switch conditioning circuit configured to detect an opening of a switch associated with a component of the machine, and set a state of the latch indicating the opening of the switch; and an ECM input driver circuit associated with the latch, the ECM input driver circuit configured to output a signal, that identifies the state, to an ECM of the machine to cause the ECM to perform one or more actions based on the state.

According to some implementations, a tamper detection system may include an ECM of a machine, and a tamper detection module to detect, while the machine is powered off, an opening of a switch that is associated with a component of the machine, wherein the opening of the switch indicates tampering with the component of the machine; set, while the machine is powered off, a state of a latch based on detecting the opening of the switch, wherein the state, while set, indicates that the switch was opened; and cause, when the machine is powered on, the ECM to provide an indication that tampering with the component of the machine has occurred based on the state.

According to some implementations, a method may include detecting, by a first device while a machine is powered off, an opening of a switch that is associated with a component of the machine, wherein the opening of the switch indicates tampering with the component of the machine; setting, by the first device while the machine is powered off, and based on detecting the opening of the switch, a state of a latch, wherein the state, while set, indicates that the switch was opened; and providing, by the first device to a second device when the machine is powered on, an output that identifies the state to cause the second device to perform one or more actions based on the state.

DETAILED DESCRIPTION

The tamper detection system described herein may be implemented with various machines, such as loaders, dozers, excavators, motor graders, and/or the like. The tamper detection system also may be implemented with tools, tool boxes, power generators, worksite shacks, and/or the like.

Figure 1:
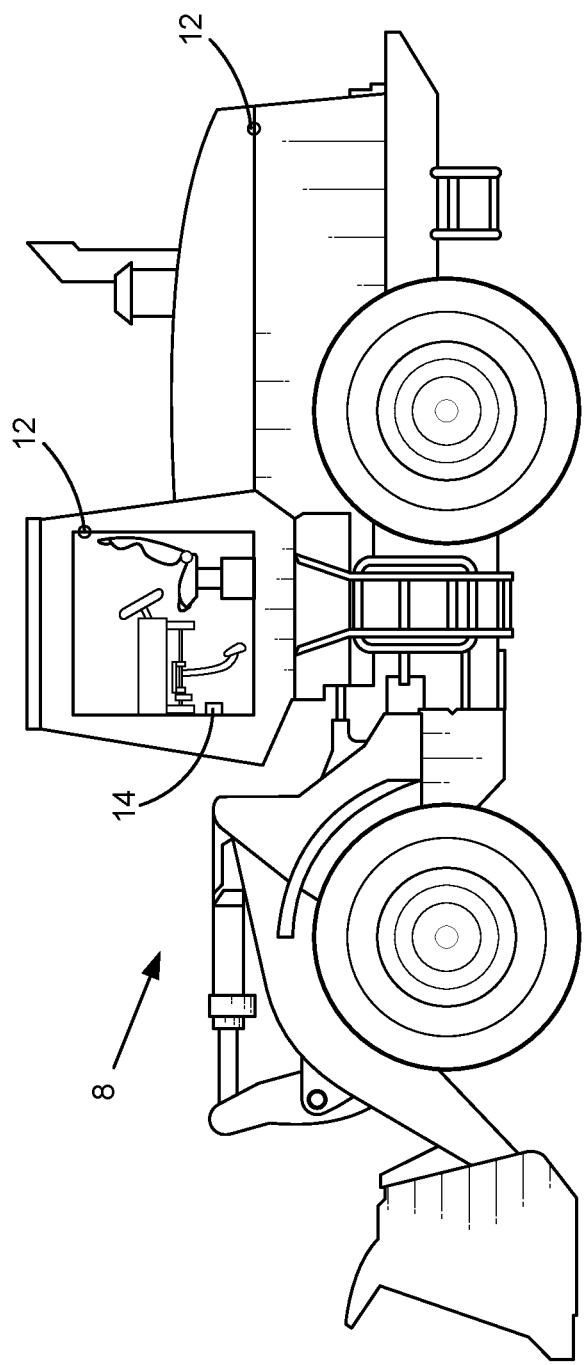
FIG. 1 is diagram of an example machine described herein.

FIG. 1 is a diagram of an example machine 8 described herein. As shown, machine 8 may include one or more switches 12. Each switch 12 may be associated with a particular component of machine 8. For example, a switch 12 may be associated with a battery of machine 8, a filter (e.g., an oil filter, a fuel filter, an air filter, a hydraulic filter, a transmission filter, a cabin air filter, and/or the like) of machine 8, an engine of machine 8, a transmission of machine 8, a cab (e.g., a cab door) of machine 8, a plug or a cap for a receptacle of a fluid (e.g., fuel, engine oil, engine coolant, hydraulic fluid, transmission fluid, and/or the like) of machine 8, an access panel (e.g., a security panel) of machine 8, a steering system of machine 8, a brake system of machine 8, a hydraulic system of machine 8, or the like.

A switch 12 may be a mechanical switch (e.g., a switch that does not require power to operate). In such a case, switch 12 may be a normally-closed mechanical switch (e.g., a mechanical switch that is closed as long as a component of machine 8 associated with the mechanical switch is not disturbed from a usual, resting position). For example, switch 12 may be a reed switch or a limit switch (e.g., a lever limit switch or a roller-arm limit switch).

In an example, switch 12 may be a reed switch that is associated with a fluid plug of machine 8 (e.g., the reed switch may be located in a socket for the fluid plug) or a cab door of machine 8 (e.g., the reed switch may be located adjacent the cab door). The fluid plug or the cab door may include a magnet that maintains the reed switch in a closed position. Thus, if the fluid plug is tampered with (e.g., removed from the socket) or the cab door is opened, the reed switch will open. In another example, switch 12 may be a limit switch that is associated with a battery of machine 8 (e.g., located in a battery compartment of machine 8). The limit switch may be located underneath the battery such that a weight of the battery maintains the limit switch in a closed position. Thus, if the battery is removed from machine 8, the limit switch will open. In a further example, switch 12 may be a shorting connector associated with an access panel of machine 8 such that the shorting connector must be removed to open the access panel.

The one or more switches 12 may be associated with (e.g., by a wired connection) a tamper detection module 14 of machine 8. Tamper detection module 14 may be located in a cabin of machine 8. For example, tamper detection module 14 may be located on, within, or behind, a dashboard of the cabin. As another example, tamper detection module 14 may be located underneath or behind a seat of the cabin (e.g., on a floor of the cabin or on a back wall of the cabin). In some implementations, tamper detection module 14 may be associated with another location of machine 8, such as a wheel well of machine 8, an engine compartment of machine 8, or another location of machine 8 that is inconspicuous.

Figure 2:
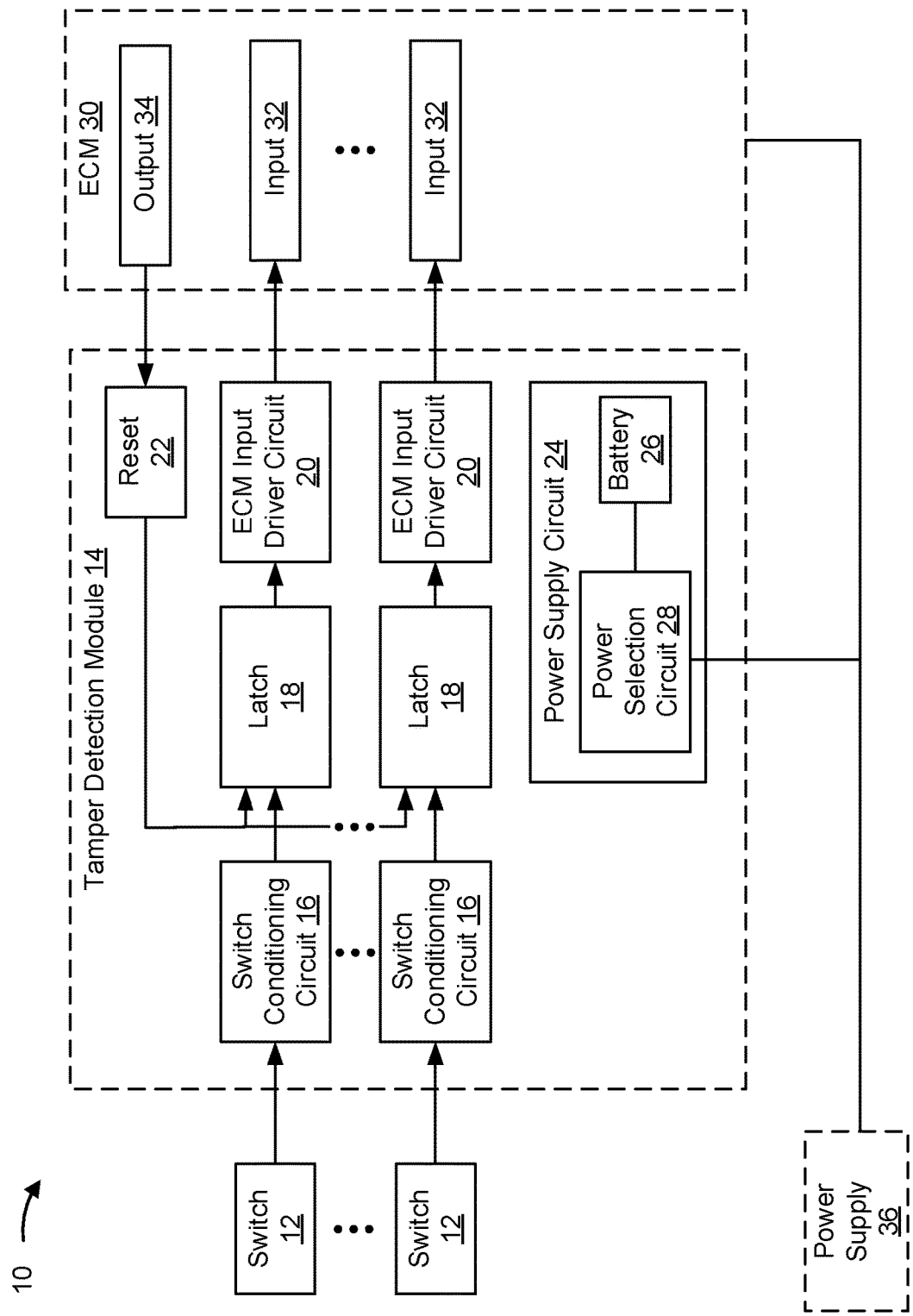
FIG. 2 is diagram of an example tamper detection system described herein.

Tamper detection module 14 may be associated with (e.g., by a wired connection) one or more ECMs 30 (shown in FIG. 2). An ECM 30 may be a component (e.g., a preexisting component) of machine 8. In such a case, tamper detection module 14 may be connected to ECM 30 during installation of tamper detection module 14 in machine 8. Alternatively, ECM 30 and tamper detection module 14 may be provided together and installed in a machine that lacks an ECM or installed on an item lacking an ECM (e.g., a tool box, a worksite shack, and/or the like).

An ECM 30 may implement software that permits ECM 30 to provide signals to, or interpret signals from, tamper detection module 14. For example, the software may permit ECM 30 to maintain a mapping of switches 12 to components of machine 8 (e.g., switch 1/battery, switch 2/cabin, switch 3/air filter, and/or the like).

ECM 30 may be associated with (e.g., by a wired connection) one or more power supplies 36 (shown in FIG. 2) of machine 8. A power supply 36 may be a battery of machine 8. In addition, tamper detection module 14 may be associated with the one or more power supplies 36 by a direct connection or a connection made via ECM 30.

As indicated above, FIG. 1 is provided as an example. Other examples may differ from what is described in connection with FIG. 1.

FIG. 2 is a diagram of an example tamper detection system 10 described herein. As shown in FIG. 2, tamper detection system 10 may include a switch 12, a tamper detection module 14 (i.e., a first device), an ECM 30 (i.e., a second device), and a power supply 36.

Tamper detection module 14 may include a switch conditioning circuit 16, a latch 18, an ECM input driver circuit 20, a reset circuit 22, and/or a power supply circuit 24. Tamper detection module 14 may be configured to detect and record tampering events associated with machine 8 while machine 8 is powered off. Machine 8 may be powered off while a key switch of machine 8 is set to an off position, while machine 8 is unpowerable (e.g., a battery of machine 8 has been removed or a battery disconnect switch of machine 8 has been set), and/or the like. Tamper detection module 14 also may detect and record tampering events associated with machine 8 while machine 8 is powered on. Machine 8 may be powered on while a key switch of machine 8 is set to an on position or an accessory position.

Tamper detection module 14 may include a power supply circuit 24. Power supply circuit 24 may include a battery 26 and a power selection circuit 28. Power selection circuit 28 may select between battery 26 (e.g., a 9V battery) and power supply 36 of machine 8 for powering tamper detection module 14 based on whether machine 8 is powered on. For example, power selection circuit 28 may include a relay that causes power selection circuit 28 to select between battery 26 and power supply 36. When machine 8 is powered on, the relay may be energized by a particular voltage associated with power supply 36, and thereby connect power supply circuit 24 to power supply 36. Thus, tamper detection module 14 may receive power from power supply 36 when machine 8 is powered on.

While machine 8 is powered off, the particular voltage associated with power supply 36 is not present, thereby de-energizing the relay and disconnecting power supply circuit 24 from power supply 36. Thus, while machine 8 is powered off, tamper detection module 14 may receive power from battery 26. In some implementations, power supply circuit 24 may employ a capacitor (e.g., a supercapacitor) instead of, or in addition to, battery 26. The capacitor may be charged by power supply 36 while machine 8 is powered on, and provide power to tamper detection module 14 while machine 8 is powered off.

As noted above, switch 12 may be normally-closed and may be configured to open when tampering with a component associated with switch 12 occurs. For example, switch 12 may open when a component associated with switch 12 is disturbed, removed, opened, and/or the like. Thus, an opening of switch 12 provides an indication that a tampering event has occurred in connection with the component.

Tamper detection module 14 may include a switch conditioning circuit 16. Switch conditioning circuit 16 may be associated with a switch 12 (e.g., by a wired connection). Switch conditioning circuit 16 may be configured to detect (e.g., while machine 8 is powered off) an opening of switch 12 (which may include an open circuit associated with switch 12 caused by disconnecting or cutting a wire associated with switch 12 or tamper detection module 14). Thus, switch conditioning circuit 16 may receive a signal from switch 12 as an input and provide, as an output, an indication of whether switch 12 was opened based on the signal. Switch conditioning circuit 16 also may be configured to protect battery 26 of tamper detection module 14 from shorts to ground.

In order to reduce nuisance signals from switch 12 (e.g., signals that falsely indicate an opening of switch 12 caused by vibration or bouncing of machine 8), switch conditioning circuit 16 may be configured to provide debouncing of a signal from switch 12. In this case, switch conditioning circuit 16 may include a resistor-capacitor (RC) circuit. An opening of switch 12 may cause the resistor to charge the capacitor. When charging of the capacitor satisfies a threshold voltage, switch conditioning circuit 16 may output a signal (e.g., a voltage) indicating that switch 12 was opened (e.g., a logic 1).

Tamper detection module 14 may include a latch 18 (e.g., a flip-flop). Latch 18 may be associated with switch conditioning circuit 16 (e.g., by a wired connection). Latch 18 may receive (e.g., while machine 8 is powered off) a signal (e.g., a signal indicating that switch 12 was opened) from switch conditioning circuit 16 as an input. The signal from switch conditioning circuit 16 may set a state of latch 18. The state, while set, may persist until latch 18 is reset, and may indicate that switch 12 was opened. Latch 18 may output a signal (e.g., a voltage) indicating the state of latch 18 (e.g., a logic 1).

Tamper detection module 14 may include an ECM input driver circuit 20. ECM input driver circuit 20 may be configured to isolate tamper detection module 14 from ECM 30 such that ECM 30 does not draw current from tamper detection module 14. ECM input driver circuit 20 may be associated with latch 18 (e.g., by a wired connection). ECM input driver circuit 20 may receive a signal (e.g., a signal indicating the state of latch 18) from latch 18 as an input, and may store the state (e.g., a logic 1) of latch 18 (e.g., while machine 8 is powered off). In some implementations, ECM input driver circuit 20 may include a metal-oxide semiconductor field-effect transistor (MOSFET).

When machine 8 is powered on, tamper detection module 14 may receive power from power supply 36, as described above, thereby causing ECM input driver circuit 20 to provide an output indicating the state of latch 18. In some cases, a tamper event may occur while machine 8 is powered on, and ECM input driver circuit 20 may provide an output upon receiving a signal indicating the state of latch 18. ECM input driver circuit 20 may provide the output to an input 32 of ECM 30 in response to a request of ECM 30 (e.g., in response to a polling of ECM input driver circuit 20 by ECM 30). A low signal output (e.g., zero volts) from ECM input driver circuit 20 may indicate that switch 12 was opened.

The output of ECM input driver circuit 20 (e.g., indicating that switch 12 was opened) may cause ECM 30 to determine that a tamper event has occurred in connection with a component associated with switch 12 (e.g., based on a mapping of components to switches stored by ECM 30). The output of ECM input driver circuit 20 further may cause ECM 30 to perform one or more actions (e.g., based on determining that the tamper event has occurred in connection with the component).

For example, ECM 30 may transmit a notification (e.g., using a communications interface of ECM 30) indicating tampering with the component. The notification also may provide instructions (e.g., replacement instructions), recommendations (e.g., machine care recommendations or maintenance recommendations), and/or the like based on an identity of the component. ECM 30 may transmit the notification to a user device associated with a crew of machine 8, an owner of machine 8, a maintenance or a security entity responsible for machine 8, and/or the like.

As another example, ECM 30 may activate an annunciator (e.g., a light, a dashboard display, an alarm, and/or the like) of machine 8 that indicates tampering with the component. In some implementations, ECM 30 also may disable one or more components of machine 8 based on an identity of the component (e.g., to prevent damage to the component or to machine 8). For example, ECM 30 may disable an engine of machine 8 when the component is an oil plug in order to prevent damage to the engine.

After determining one or more tamper events and/or performing the one or more actions, ECM 30 may cause latch 18 to reset (e.g., ECM 30 may cause tamper detection module 14 to unset a state of latch 18). For example, ECM 30 may transmit a reset signal, via an output 34 of ECM 30, to a reset circuit 22 of tamper detection module 14. Continuing with the previous example, reset circuit 22 may be configured to reset latch 18 upon receiving the reset signal from ECM 30. In addition, reset circuit 22 may be configured to isolate tamper detection module 14 from ECM 30 such that ECM 30 does not draw current from tamper detection module 14.

In some implementations, a tamper event may persist after latch 18 has been reset. For example, a tamper event associated with an air filter being removed from machine 8 may persist if the air filter was not replaced prior to machine 8 powering on. In such a case, switch conditioning circuit 16 may set a state of latch 18 following the reset, and ECM input driver circuit 20 may indicate the state of latch 18 to ECM 30, in a manner similar to that described above. Thus, ECM 30 may determine, after resetting latch 18, that the tamper event is ongoing based on receiving an indication that latch 18 has returned to a set state. Accordingly, ECM 30 may perform one or more actions in a manner similar to that described above based on latch 18 returning to the set state. In this case, an indication provided by ECM 30 may indicate that the tamper event is ongoing.

In some implementations, tamper detection module 14 may detect and report an opening of switch 12 while machine 8 is powered on (e.g., an access panel associated with switch 12 may open while machine 8 is powered on), in a manner similar to that described above. Additionally, tamper detection system 10 may be configured to mode switch between a first mode, while machine 8 is powered on, and a second mode, while machine 8 is powered off. In the first mode, tamper detection module 14 may detect a tamper event (e.g., a tamper event occurring while machine 8 is powered on), and output a signal to ECM 30 that causes ECM 30 to perform one or more actions, in a manner similar to that described above. In the second mode, tamper detection module 14 may detect and store an indication of a tamper event, and output a signal to ECM 30, when machine 8 is powered on, that causes ECM 30 to perform one or more actions, in a manner similar to that described above.

While the description of tamper detection system 10 above concerns a single switch 12, a single tamper detection module 14 group (i.e., switch conditioning circuit 16, latch 18, and ECM input driver circuit 20), and a single input 32 of ECM 30, implementations of tamper detection system 10 may include multiple switches 12, multiple tamper detection module 14 groups, and multiple inputs 32 of ECM 30. For example, tamper detection module 14 may include multiple tamper detection module 14 groups, and each tamper detection module 14 group may correspond to a switch 12 and an input 32 of ECM 30. As an example, tamper detection module 14 may include four tamper detection module 14 groups.

In some implementations, ECM 30 may employ a multiplexing component to permit multiplexing of outputs from multiple tamper detection modules 14, thereby allowing a quantity of tamper detection module 14 groups of 8, 12, 16, 20, or more. In such a case, a tamper detection module 14 may output a signal to the multiplexing component of ECM 30. Thus, the multiplexing component may permit ECM 30 to process an output of a particular tamper detection module 14 among the multiple tamper detection modules 14.

As indicated above, FIG. 2 is provided as an example. Other examples may differ from what is described in connection with FIG. 2.

Figure 3:
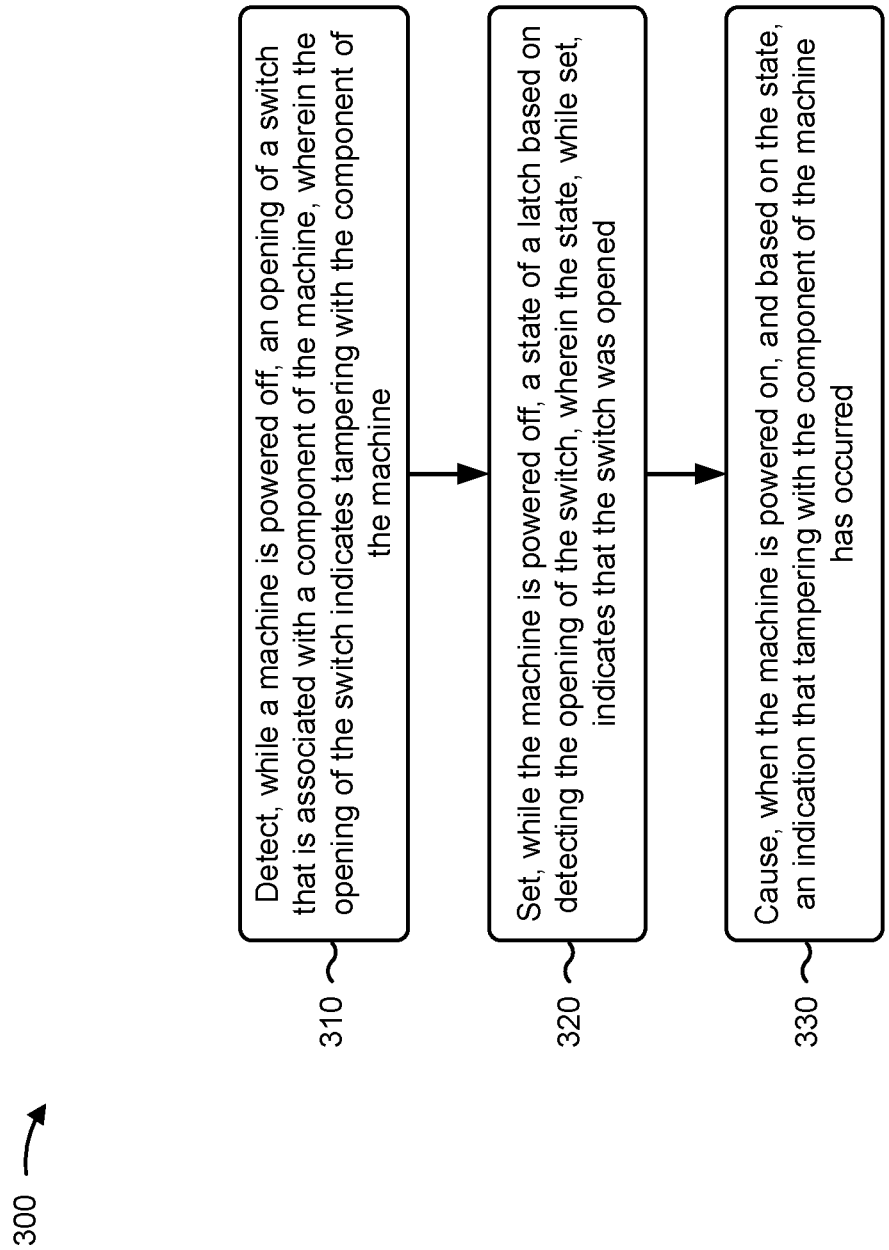
FIG. 3 is a flow chart of an example process for tamper detection.

FIG. 3 is a flow chart of an example process 300 for tamper detection. In some implementations, one or more process blocks of FIG. 3 may be performed by a tamper detection module (e.g., tamper detection module 14). In some implementations, one or more process blocks of FIG. 3 may be performed by another device or a group of devices separate from or including the tamper detection module, such as a switch (e.g., switch 12) an ECM (e.g., ECM 30), and/or the like.

As shown in FIG. 3, process 300 may include detecting, while a machine is powered off, an opening of a switch that is associated with a component of the machine, wherein the opening of the switch indicates tampering with the component of the machine (block 310). For example, the tamper detection module may detect, while a machine is powered off, an opening of a switch that is associated with a component of the machine, as described above. In this case, a switch conditioning circuit of the tamper detection module may be configured to, while the machine is powered off, detect the opening of the switch associated with the component of the machine. The switch conditioning circuit may include a resistor-capacitor circuit. The switch conditioning circuit further may be configured to provide debouncing of a signal of the switch.

The component may be a battery of the machine, a filter of the machine, an engine of the machine, a cab of the machine, a plug for a fluid of the machine, or an access panel of the machine. The switch may be a mechanical switch, such as a reed switch or a limit switch.

The tamper detection module also may include a power supply circuit that is configured to selectively power the tamper detection module by a power supply of the tamper detection module or a power supply of the machine based on whether the machine is powered on. The power supply of the tamper detection module may be a battery that powers the tamper detection module while the machine is powered off. Alternatively, the power supply of the tamper detection module may be a capacitor that is configured to be charged while the machine is powered on.

As further shown in FIG. 3, process 300 may include setting, while the machine is powered off, a state of a latch based on detecting the opening of the switch, wherein the state, while set, indicates that the switch was opened (block 320). For example, the tamper detection module may set, while the machine is powered off, a state of a latch based on detecting the opening of the switch, as described above. In this case, a switch conditioning circuit of the tamper detection module may be configured to, while the machine is powered off, set the state of the latch indicating the opening of the switch.

As further shown in FIG. 3, process 300 may include causing, when the machine is powered on, and based on the state, an indication that tampering with the component of the machine has occurred (block 330). For example, the tamper detection module may cause, when the machine is powered on, and based on the state, an indication that tampering with the component of the machine has occurred, as described above. In such a case, an ECM input driver circuit of the tamper detection module may be configured to, when the machine is powered on, provide an output (e.g., a signal) that identifies the state to an ECM of the machine. The ECM input driver circuit may include a MOSFET. The output that identifies the state may be provided to a multiplexer of the ECM.

The output of the tamper detection module may cause an ECM to provide the indication that tampering with the component of the machine has occurred. The indication may be provided by at least one of a notification indicating tampering with the component, or an annunciator of the machine that indicates tampering with the component. In addition, the tamper detection module, when causing the ECM to provide the indication, may cause the ECM to provide the indication and provide a reset signal to the tamper detection module. The reset signal may indicate that the tamper detection module is to reset the latch. Thus, the tamper detection module may include a reset circuit that is configured to reset the latch based on the reset signal received from the ECM.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The disclosed tamper detection system 10 may be used with any machine where improved detection of tampering with a component of the machine is desired. For example, tamper detection module 14 of tamper detection system 10 may detect and record a tamper event while the machine is powered off. Ordinarily, tamper detection while the machine is powered off would require use of a battery of the machine, or another high-capacity battery, to power active switches, memories, processors, or the like. However, the battery would be quickly drained as a power requirement of these active switches, memories, and processors is significant, particularly over long periods of time.

Tamper detection module 14 employs mechanical switches and other power-efficient circuitry to facilitate tamper detection and recordation while the machine is powered off. In particular, tamper detection module 14 may draw less than one microamp of current from a battery of tamper detection module 14. In this way, tamper detection module 14 may employ a small, low-capacity battery (e.g., a 9V battery) that could power tamper detection module 14 for years, or even decades while the machine is powered off.

What is claimed is:

1. A tamper detection module, comprising:
   a latch;
   a switch conditioning circuit,
      the switch conditioning circuit configured to detect an opening of a switch when a component is removed from a machine, and set a state of the latch indicating the opening of the switch, and
      the component being a battery of the machine, a filter of the machine, an engine component of the machine, a transmission component of the machine, a plug or a cap for a receptacle of a fluid of the machine, a steering system component of the machine, a brake system component of the machine, or a hydraulic system component of the machine;
   a reset circuit; and
   an electronic control module (ECM) input driver circuit associated with the latch,
      the ECM input driver circuit configured to:
         output a signal, that identifies the state, to an ECM of the machine to cause the ECM to perform one or more actions based on the state,
      the reset circuit configured to:
         receive, from the ECM, a reset signal after the ECM receives the signal from the ECM input driver circuit, and
         reset the latch based on receiving the reset signal from the ECM.

2. The tamper detection module of claim 1, wherein the one or more actions include at least one of:
   transmitting a notification indicating tampering with the component, or
   activating an annunciator of the machine that indicates tampering with the component.

3. The tamper detection module of claim 1, wherein the switch conditioning circuit includes a resistor-capacitor circuit.

4. The tamper detection module of claim 1, wherein the switch conditioning circuit is further configured to provide debouncing of a signal of the switch.

5. The tamper detection module of claim 1, wherein the ECM input driver circuit includes a metal-oxide semiconductor field-effect transistor (MOSFET).

6. The tamper detection module of claim 1, further comprising:
a power supply circuit that is configured to selectively power the tamper detection module by a power supply of the tamper detection module or a power supply of the machine based on whether the machine is powered on.

7. The tamper detection module of claim 1, further comprising:
a power supply,
wherein the power supply is a capacitor that is configured to be charged while the machine is powered on.

8. The tamper detection module of claim 1, wherein the reset circuit isolates the tamper detection module from the ECM in a manner where the ECM does not draw power from the tamper detection module.

9. The tamper detection module of claim 1, further comprising:
a power supply circuit including:
a power supply of the tamper detection module, and
a power selection circuit configured to:
select, for powering the tamper detection module, between the power supply of the tamper detection module and a power supply of the machine based on a relay of the power selection circuit that is energized by a particular voltage associated with the power supply of the machine when the machine is powered on.

10. A tamper detection system, comprising:
an electronic control module (ECM) of a machine; and
a tamper detection module to:
detect, while the machine is powered off, an opening of a switch when a component is removed from the machine,
wherein the component is a battery of the machine, a filter of the machine, an engine component of the machine, a transmission component of the machine, a plug or a cap for a receptacle of a fluid of the machine, a steering system component of the machine, a brake system component of the machine, or a hydraulic system component of the machine, and
wherein the opening of the switch indicates tampering with the component;
set, while the machine is powered off, a state of a latch based on detecting the opening of the switch,
wherein the state, while set, indicates that the switch was opened;
cause, when the machine is powered on, and based on the state, the ECM to provide an indication that tampering with the component has occurred;
receive, using a reset circuit, a reset signal from the ECM; and
reset, using the reset circuit, the latch based on the reset signal.

11. The tamper detection system of claim 10, wherein the indication is provided by at least one of:
a notification indicating tampering with the component, or
an annunciator of the machine that indicates tampering with the component.

12. The tamper detection system of claim 10, wherein the switch is a reed switch or a limit switch.

13. The tamper detection system of claim 10, wherein the tamper detection module is powered by a battery of the tamper detection module while the machine is powered off.

14. The tamper detection system of claim 10, wherein the tamper detection module draws less than 1 microamp of current from a battery of the tamper detection module while the machine is powered off.

15. A method, comprising:
detecting, by a first device while a machine is powered off, an opening of a switch when a component is removed from the machine,
wherein the component is a battery of the machine, a filter of the machine, an engine component of the machine, a transmission component of the machine, a plug or a cap for a receptacle of a fluid of the machine, a steering system component of the machine, a brake system component of the machine, or a hydraulic system component of the machine, and
wherein the opening of the switch indicates tampering with the component;
setting, by the first device while the machine is powered off, and based on detecting the opening of the switch, a state of a latch,
wherein the state, while set, indicates that the switch was opened;
providing, by the first device and to a second device when the machine is powered on, an output that identifies the state to cause the second device to perform one or more actions based on the state;
receiving, by a reset circuit of the first device and from the second device, a reset signal after the second device receives the output; and
resetting, by the reset circuit of the first device, the latch based on the reset circuit of the first device receiving the reset signal from the second device.

16. The method of claim 15, wherein the one or more actions include at least one of:
transmitting a notification indicating tampering with the component, or
activating an annunciator of the machine that indicates tampering with the component.

17. The method of claim 15, wherein the output that identifies the state is provided to a multiplexer of the second device.

18. The method of claim 15, wherein the switch is a mechanical switch.

19. The method of claim 15, wherein the first device draws less than 1 microamp of current from a battery of the first device while the machine is powered off.

20. The method of claim 15, wherein the opening of the switch indicates tampering with the component by the plug being removed from a socket of the machine.

* * * * *